E. HÉE.
MULTIPLE SHARE PLOW.
APPLICATION FILED AUG. 11, 1919.

1,410,917.

Patented Mar. 28, 1922.

2 SHEETS—SHEET 1.

Inventor
Edmond Hée,
By H. R. Kerslake
Attorney

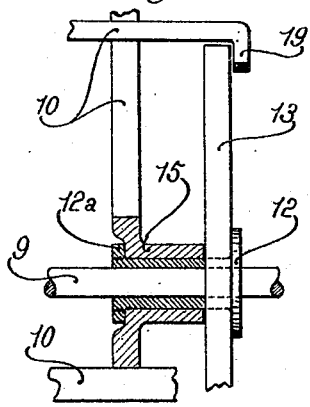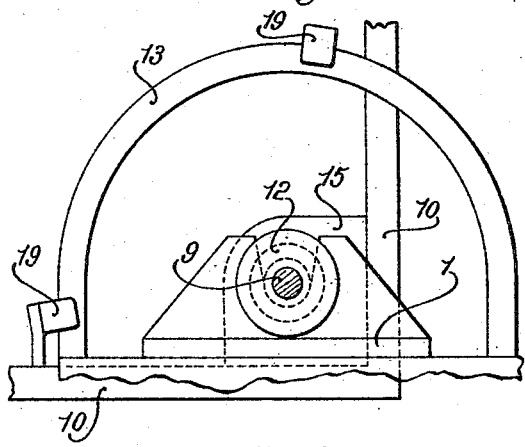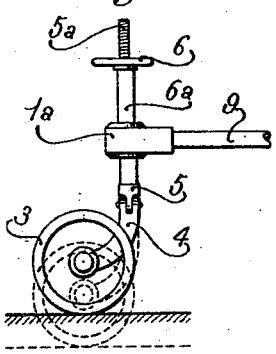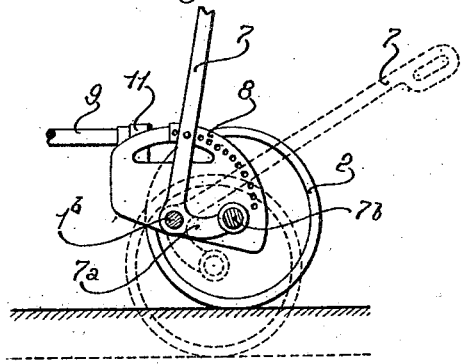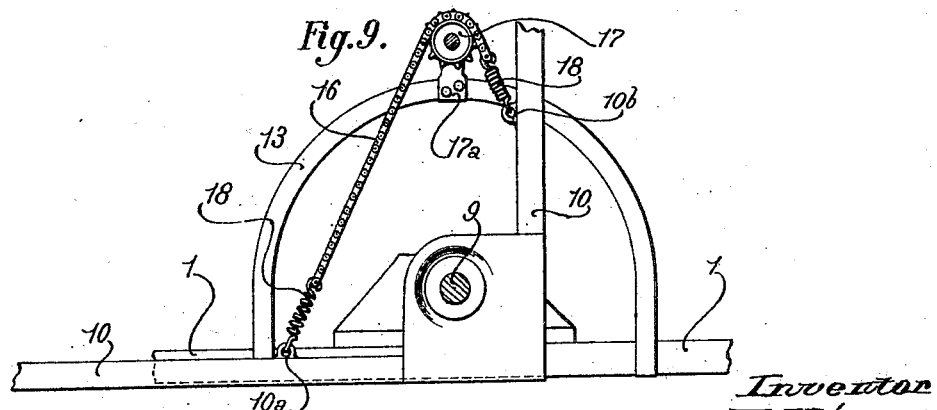

UNITED STATES PATENT OFFICE.

EDMOND HÉE, OF EVREUX, EURE, FRANCE.

MULTIPLE-SHARE PLOW.

1,410,917.  Specification of Letters Patent.  Patented Mar. 28, 1922.

Application filed August 11, 1919. Serial No. 316,859.

*To all whom it may concern:*

Be it known that I, EDMOND HÉE, a citizen of the French Republic, residing at No. 57 Rue Josephine, Évreux, Eure, France, have invented certain new and useful Improvements in Multiple-Share Plows, of which the following is a specification.

The present invention relates to improvements in multiple share plows and has for its object to provide a plow which is capable on its arrival at the end of the field after plowing a furrow to resume the plowing of the next furrow at that end and thus avoid missing a furrow. At the same time doing away with an idle travel over the field and doing without the staking out of the field, both of which are indispensable in plowing apparatus comprising simple plowshares.

As compared with double plows having a longitudinal rocking movement, the improved plow which has a transverse rocking movement, avoids the necessity of the driver uncoupling the tractor at the end of the field and it reduces at the same time the out-buildings to a minimum.

Figure 1:
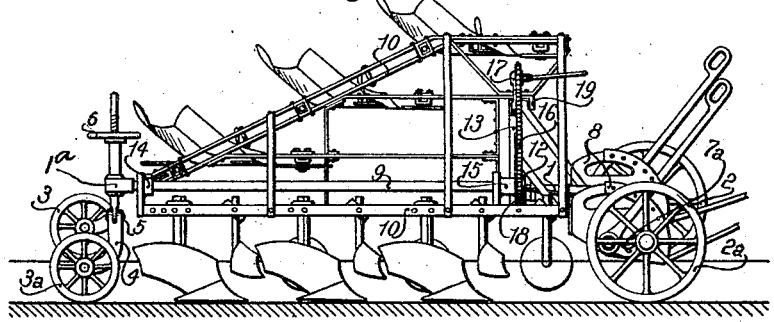
Figure 2:
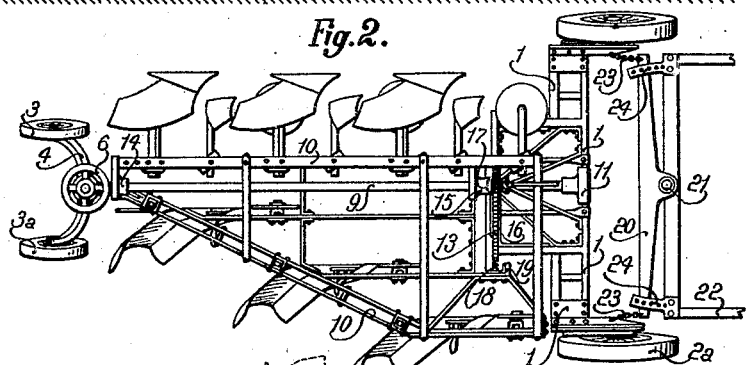
Figure 3:
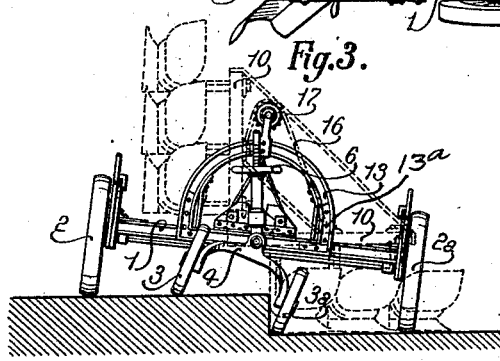
Figure 4:
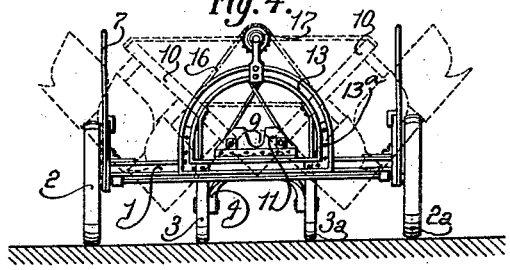

In the accompanying drawings which illustrate by way of example a constructional form of this invention, Fig. 1 is a side view of the improved plow, Fig. 2 is a plan thereof, Fig. 3 is a rear end view of the improved plow in operation, Fig. 4 is a front end view of the plow in condition for transport, Fig. 5 is an elevation of a detail of which Fig. 6 is a front view, Fig. 7 is an elevation of another detail illustrating the rear adjustment device for the depth of working, Fig. 8 is an elevation of another detail illustrating the front adjustment device for the depth of working, Fig. 9 is a back view of a detail illustrating an arrangement for rocking of the body of the plow.

The improved plow consists essentially of two parts, namely,

An under-carriage, and

A longitudinal frame for carrying the plowshares.

The under-carriage consists of a longitudinal frame 1 supported by two front wheels 2 2$^a$ and two hind wheels 3, 3$^a$.

The hind wheels are mounted on a transversely rotatable axle 4 capable of pivoting around a horizontal pivot 5 fixed to an adjusting screw 5$^a$ sliding in a member 1$^a$ fixed behind the frame 1 and at the end of a shaft 9, the said adjusting screw 5$^a$ being actuated by means of a hand wheel 6.

In order to adjust the height of the wheels and therefore the depth of working, the hand-wheel 6 is acted upon, which hand-wheel bears on a cross member 6$^a$ and is screwed on the screw 5$^a$ raising or lowering the undercarriage and the shaft 9 on the wheels 3 and 3$^a$.

Owing to this pivotal arrangement, one of the hind wheels is able to run in the furrow, whilst the other wheel can run on the land, that is to say, the ground which has not yet been plowed (Fig. 3).

On the other hand, one of the front wheels 2, 2$^a$ is also capable of running alternately in the furrow on the outward journey and on the unplowed ground on the return journey, without however, affecting the height relatively to the ground level of the hereinafter described frame that carries the plowshares.

The regulation as to height which determines the depth of the plowing is effected once for all at the beginning of the work in the case of both front and hind wheels.

In the case of each of the front wheels 2, 2$^a$ this adjustment is effected by means of a bell-crank lever 7, the end of the lower arm 7$^a$ of which is pivoted to the axle of the wheel 2 at 7$^b$, Fig. 8. Each lever 7 is pivoted at 1$^b$ to vertical side plates 8 carried by the underframe 1. By angularly adjusting the levers 7 the height of the wheels 2, 2$^a$ with respect to the carriage 1 can be varied. Each lever 7 can be secured in adjusted position by means of pins or the like fitting in perforations in sectors 8 formed on or carried by the plates 8.

The rear axle 4 is connected to the front part of the under-carriage by a longitudinal shaft 9 which serves as an axis for the rotation and as a support for the frame 10 that carries the plow-shares. The front end of this shaft 9 rests in a bracket 11 carried by the under-carriage. The bearing 12 and the arc-shaped member 13 receiving the tractive force are fixed to the under-carriage 1, Figs. 5 and 6.

The frame 10 that carries the plowshares comprises a rear bearing 14 and a front bearing 15, by means of which the frame 10 is pivotally mounted on the shaft 9. The said frame consists of a double right-angled frame, see particularly Fig. 3, carrying along each side the plowshares and colters, the plowshares on one side of the frame being arranged to turn the soil to the right, while the shares on the other side are arranged to turn the soil to the left. Thus, on both the outward and return journey the soil will be turned over to the same side.

This result is produced by the transverse rocking movement of the two series of plowshares which act upon the ground alternately in the outward and return journeys over the field.

The rocking of the plowshares carrying frame 10 is effected by means of a chain 16 attached at each of the ends to the sides of the frame 10. This chain passes over and is driven by a pinion 17 mounted on a member 17$^a$, secured to the arc-shaped member 13, and is actuated by the driver from his seat.

The chain 16 is connected at 10$^a$ and 10$^b$ to perpendicular parts of the frame 10, a spring 18 being interposed between the plowshare-carrying frame 10 and the chain 16 for the purpose of softening the shock of the motion and for causing the plowshares to penetrate gradually into the ground.

By this arrangement the frame 10 will always be perfectly parallel to the ground level, whatever may be the inclination of the supporting wheels.

The tractive force is transmitted to the plow by the bearing 15 having the form of a circular sleeve with a collar, made in one piece with the plow frame 10. This bearing 15 which is carried by the shaft 9, is adapted in its turn to revolve upon the bearing 12 which is fixed to the under-carriage 1, Figs. 5 and 6, and is supported thereon by a stop 12$^a$ of the bearing 12 and by two hooks 19 fixed to the frame 10 and adapted to bear and slide on an arc-shaped member 13 fixed to the under-carriage.

By this arrangement the traction is always assured irrespectively of the position of the plowshare frame.

The plowshare frame may be fixed in position relatively to the under-carriage by means of a pin passing through a part of the frame 10 and fitting into perforations 13$^a$ in the member 13.

The plow may be attached to the tractor vehicle by a coupling apparatus comprising a swingle-tree 20 jointed at 21 to the rear of the tractor 22. This swingle-tree which serves as a coupling bar is attached to the under-carriage 1 of the plow by chains 23.

During the plowing the lateral pressure acting upon the plowshares is compensated to a certain extent by the inclination assumed by the swingle-tree 20 the extent of whose angular movement can be limited to two sectors 24 pierced with holes and serving as slideways.

The coupling apparatus, instead of being fixed in part to the tractor vehicle as shown in Fig. 2 may be made if desired wholly in one piece with the under-carriage 1, and be connected to the tractor by means of chains etc.

It is to be understood that other coupling apparatus may be employed, such as shafts or any other suitable devices.

What I claim is:—

1. In a multiple-share plow, the combination with an undercarriage, of a longitudinal axle fixedly mounted on said undercarriage in a horizontal plane, a longitudinal frame composed of two frame members joined together at right angles, adapted to rock transversely on said longitudinal axle, two series of plowshares mounted respectively on the sides of said longitudinal frame and means for rocking said frame over to the opposite side for the purpose of bringing either of the said two series of plowshares into operative position for plowing a furrow.

2. In a multiple-share plow, the combination with the undercarriage, of a longitudinal axle fixed to said undercarriage, a transverse sector fixed to said undercarriage, a longitudinal frame adapted to rock transversely on said longitudinal axle, two series of plowshares mounted respectively on the sides of said longitudinal frame, means for rocking said longitudinal frame transversely on said longitudinal axle, and two hooks fixed to said longitudinal frame adapted to engage and slide on said sector and thereby guide said longitudinal frame in its transverse rocking movements.

3. In a multiple-share plow, the combination with the undercarriage, of a longitudinal frame adapted to rock transversely on an axis extending in the longitudinal direction of the plow, two series of plowshares adapted to throw the soil over to the same side, carried respectively by the two sides of said longitudinal frame, means for rocking said frame over to the opposite side when the plow has plowed one furrow with one series of plowshares, for the purpose of bringing the other series of plowshares into operative position for plowing the next furrow, a hind-carriage composed of two hind wheels mounted on a vertically and horizontally rotatable axle, and means for connecting said rotatable axle to the rear of said undercarriage, whereby each of said hind wheels can run alternately in the furrow, whilst the corresponding front wheel of said undercarriage can run alternately in the furrow and on the unplowed ground.

4. In a multiple-share plow, the combination with the undercarriage, of a longitudinal frame adapted to rock transversely on an axis extending in the longitudinal direction of the plow, two series of plowshares adapted to throw the soil over to the same side, carried respectively by the two sides of said longitudinal frame, and means comprising a chain engaging said transverse frame, and a chain pinion operable from the driver's seat, actuating said chain for rocking said frame over to the opposite side when the plow has plowed one furrow with one series of plowshares, for the purpose of bringing the other series of plowshares into operative position for plowing the next furrow.

5. In a multiple-share plow, the combination with the undercarriage of a longitudinal frame adapted to rock transversely on an axis extending in the longitudinal direction of the plow, two series of plowshares adapted to throw the soil over to the same side, carried respectively by the two sides of said longitudinal frame, means for rocking said frame over to the opposite side when the plow has plowed one furrow with one series of plowshares, for the purpose of bringing the other series of plowshares into operative position for plowing the next furrow, and apparatus for coupling the plow to a tractor, comprising a swingle-tree or cross bar pivotally connected to a bar that is fixed in relation to said tractor, said swingle-tree or cross bar being capable of assuming an inclined position that will compensate the lateral pressure acting upon said plowshares during the plowing.

In testimony whereof I have signed my name to this specification.

EDMOND HÉE.